United States Patent [19]

Tanaka et al.

[11] 4,298,265

[45] Nov. 3, 1981

[54] LIGHT-INTERCEPTING DEVICE IN A CAMERA

[75] Inventors: Etsuo Tanaka, Tokyo; Hironobu Kato, Urawa, both of Japan

[73] Assignee: Nippon Kogaku K.K., Tokyo, Japan

[21] Appl. No.: 152,603

[22] Filed: May 23, 1980

[30] Foreign Application Priority Data

Jun. 2, 1979 [JP] Japan .................................. 54/69082

[51] Int. Cl.³ .............................................. G03B 9/40
[52] U.S. Cl. ........................................ 354/246; 354/249; 354/250; 354/264; 354/274
[58] Field of Search ............... 354/241, 242, 245, 246, 354/247, 248, 249, 250, 261, 264, 274

[56] References Cited

U.S. PATENT DOCUMENTS 3,078,776  2/1963  Okabe ................................. 354/246
3,903,539  9/1975  Kitai et al. .......................... 354/246

Primary Examiner—Russell E. Adams
Attorney, Agent, or Firm—Fitzpatrick, Cella, Harper & Scinto

[57] ABSTRACT

In a light-intercepting device in a camera including a plurality of flat light-intercepting vanes disposed on a light-intercepting plane crossing an optical path, the light-intercepting vanes comprise a substrate formed of titanium or a titanium alloy, and a hardened layer of titanium compound formed on the surface of the substrate.

4 Claims, 5 Drawing Figures

LIGHT-INTERCEPTING DEVICE IN A CAMERA

BACKGROUND OF THE INVENTION

1. Field of the Invention

This invention relates to improvements in a light-intercepting device in a camera having light-intercepting vanes required to be operated (moved) at high speed, like a shutter device such as focal plane shutter or lens shutter or a diaphragm device of a lens.

2. Description of the Prior Art

A shutter device has its light-intercepting vanes required to be moved at high speed for the purpose of securing uniformity of exposure time in various parts of the picture-taking plane, and a diaphragm device has its light-intercepting vanes required to be moved at high speed for the purpose of shortening the stop-down time existing in the exposure operation sequence of a camera. It is conventional to make the light-intercepting vanes themselves lighter in weight for the purpose of high speed movement (as another means, it would occur to mind to increase the driving force of the light-intercepting vanes, but this is not preferable because it increases the load of the film advance lever of the camera or the preset aperture ring of the lens and gives an unpleasant feeling to the operator or, when a motor drive device is mounted on the camera, it increases the power consumption of the motor).

Now, in focal plane shutter devices of the type in which a forward shutter curtain (a first light-intercepting member) and a rearward shutter curtain (a second light-intercepting member) are wound on a drive drum, as is generally called the Leika type, it is known to form the forward and rearward shutter curtains of titanium foil. As the reasons why titanium foil is suited for the drum type focal plane shutter device, mention may be made of (1) its light weight and (2) its low rigidity (the readiness with which it is wound on the drive drum).

However, heretofore, none of the diaphragm devices or even shutter devices, particularly, metal blade type focal plane shutter devices in which, as is called the square type, a first and a second light-intercepting member are constituted by vanes of metal (usually carbon steel) and these metal vanes are driven by a link mechanism so as to be parallel-moved just in front of the focal plane to thereby open and close an aperture, has not used titanium material, namely, titanium or titanium alloy for the metal vanes. The reason is as follows:

(a) Titanium material has a relatively low longitudinal elastic modulus (Young's modulus) and thus is lower in rigidity than carbon steel vanes. Therefore, vanes of titanium material are small in deformation resistance and are liable to be deformed during operation and deviated from the movement orbit of the vanes, thus being damaged. That is, to make the most of the above-described advantage of light weight of titanium material in the light-intercepting vanes of the metal blade type focal plane shutters or the diaphragm devices, the low rigidity of titanium material which is advantageous to the drum type focal plane shutter devices has fatal drawback.

(b) In a light-intercepting device constructed by combining a plurality of light-intercepting vanes, the vanes of titanium material, as compared with carbon steel vanes, has disadvantages that sticking is liable to occur and that wear is liable to take place and therefore, not only it is difficult to move the vanes smoothly at high speed but also the connection of the vanes to the link mechanism lacks durability.

SUMMARY OF THE INVENTION

It is an object of the present invention to provide a light-intercepting device in a camera having light-intercepting vanes provided with a sufficient mechanical property to be driven so as to be parallel-moved on a plane at high speed.

The light-intercepting device according to the present invention is characterized in that the light-intercepting vanes thereof formed with titanium material, namely, titanium or a titanium alloy as the base material is subjected to a surface hardening treatment. This surface hardening treatment includes nitriding, boriding or oxidization which is known per se, or the surface hardening treatment as disclosed in Japanese Laid-open patent application No. 120642/1978 wherein nitriding and oxidization are carried out at the same time.

By such surface hardening treatment, a compound of titanium is produced on the surface of the titanium material. This compound is very hard, for example, about 2000 Hv for titanium nitride, about 2500 Hv for titanium boride, or about 1600 Hv for titanium oxide. Therefore, the rigidity of the entire light-intercepting vanes is improved and the vanes become difficult to be deformed.

If the connecting portion of the light-intercepting vanes which receives the drive force from a drive mechanism is also integrally formed of titanium material and such portion is also subjected to the above-described surface hardening treatment, sticking of the connecting portion will become unlikely to occur because the hardness of the compound is very high and as a result, smooth movement may be secured and wear characteristics will be improved.

Titanium oxide relatively lacks in tenacity, to which attention must be paid.

The invention will become more fully apparent from the following detailed description of some embodiments thereof taken in conjunction with the accompanying drawings.

DESCRIPTION OF THE PREFERRED EMBODIMENTS

Figure 1:
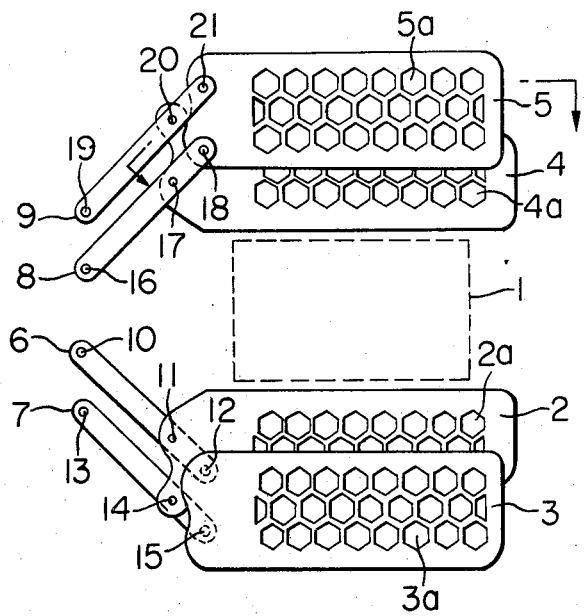
FIG. 1 is a schematic view of a metal blade type focal plane shutter.
Figure 2:
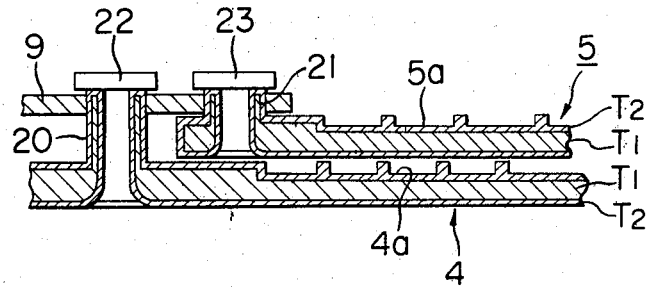
FIG. 2 is a cross-sectional view taken along the arrow in FIG. 1.

Referring to FIGS. 1 and 2, a first group of light-intercepting vanes 2 and 3 are driven downwardly as viewed in FIG. 1 while being successively overlapped to each other by a link mechanism comprising arms 6 and 7 and rotary shafts 10, 11, 12, 13, 14 and 15, thereby opening an aperture 1. A second group of light-intercepting vanes 4 and 5 are driven downwardly as viewed in FIG. 1 by a link mechanism comprising arms 8 and 9 and rotary shafts 16, 17, 18, 19, 20 and 21, thereby closing the aperture 1.

The light-intercepting vanes 2, 3, 4 and 5 are provided with hexagonal hollow portions 2a, 3a, 4a and 5a arranged of honeycomb form so as to increase the strength of the vanes and also make the vanes lighter in weight. The operation of the above-described shutter driving mechanism and vanes is well-known and need not be described any further.

Now, in FIG. 2, the composition of the cross-section of the light-intercepting vanes 4 and 5, for example, will be considered. Each of the light-intercepting vanes 4 and 5 comprises a base member $T_1$ of titanium material and a layer $T_2$ of titanium compound produced on the surface of the base member as by a nitriding treatment. This layer $T_2$ of titanium compound is high in hardness as previously described and so, the rigidity of the vanes is improved and the vanes are difficult to deform.

Also, the movement of the light-intercepting vanes 2, 3 and 4, 5 is such that they are parallel-moved on the light-intercepting plane while being overlapped to each other and therefore, it is sometimes the case that, for example, the vanes 4 and 5 are moved with the lower surface of the vane 4 rubbing against the upper surface of the vane 5. Even in such case, however, the wear of the two vanes is unlikely to occur because the layer $T_2$ of titanium compound is very high in hardness. Also, for example, the friction coefficient between the two surfaces is considerably small, say, about 0.1–0.3 and so, the energy loss resulting from such rubbing is small.

Further, in this embodiment, each of the light-intercepting vanes 2, 3, 4 and 5 is apertured by drilling and drawing, and rotary shafts 11, 12, 14, 15, 17, 18, 20 and 21 connected to the arms 6, 7, 8 and 9 are formed in these vanes, the surfaces of these rotary shafts being also formed with a layer $T_2$ of titanium compound. Pins 22 and 23 are calking pins for coupling the arm 9 to each of the vanes 4 and 5 and also serve as the reinforcing members for the rotary shafts 20 and 21. Thus, the portions of pivotal contact of the vanes with the arm 9 are hardened by the titanium compound and so, the vanes 4 and 5 of titanium material themselves can form the rotary shafts. The material of the arm 9 may be carbon steel or titanium material having the surface thereof hardened. For example, where titanium material subjected to a nitriding treatment is used as the arm and vanes, energy loss can be reduced because the friction coefficient between the respective surfaces is considerably small as previously mentioned.

When the light-intercepting vanes constructed in the described manner (manufactured by a nitriding treatment) were used in a commercially available metal blade type focal plane shutter (of course, the vanes are equal in size and accordingly, substantially equal in volume unless they are hollowed), the experimental result as shown in Table 1 below was obtained.

TABLE 1

|  | Vanes of titanium material subjected to nitriding treatment | Vanes of carbon steel |
|---|---|---|
| Drive force (value at initial stage of drive | 74.6 gr | 74.6 gr |
| Weight of vanes | 0.302 gr (hollowed) | 0.795 gr |
| Average vane speed (during movement by 24mm in the longitudinal direction of aperture | 5.32 m/sec. | 3.43 m/sec. |
| X-contact synchronous shutter speed | 1/180 sec. | 1/125 sec. |

The hollowed vanes of titanium material used in the present experiment are lighter in weight by 0.158 gr. than unhollowed vanes of titanium material, due to the hollowing. That is, they are expressed by 0.46 (unhollowed) −0.158=0.302 gr.

According to this, under the same drive force, the average speed of the vanes of titanium material as opposed to the vanes of carbon steel material is about 1.65 times. Where the vanes of titanium material are unhollowed, the average speed thereof is theoretically about 1.36 times. Accordingly, the average vane speed is improved by changing the material even if the hollowing is not resorted to. If the average vane speed is higher, the average slit width (the spacing between the aperture opening vane and the aperture closing vane) for the exposure time can be made wider and this leads to the effect that the exposure irregularity, particularly during high speed shutter time, can be prevented and the irregularity of the shutter speed can be reduced. Also, the X-contact synchronous shutter speed has been improved to 1/180 sec. This is a value which has not yet been realized in commercially available metal blade type focal plane shutter devices.

Figure 3:
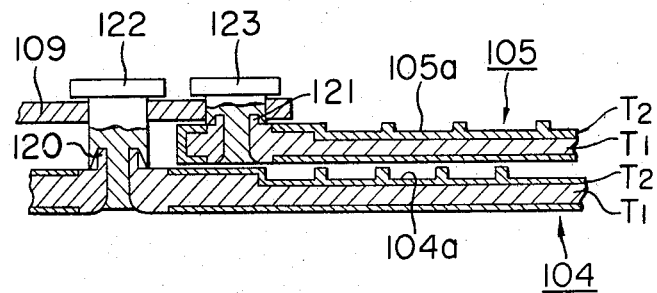
FIG. 3 is a cross-sectional view showing an embodiment different from the embodiment of FIG. 2.

FIG. 3 is a cross-sectional view showing another embodiment of the rotary shafts. In this embodiment, rotary shafts 120 and 121 are not subjected to a nitriding treatment. Instead, arms 109, 122 and 123 are formed of a conventional material.

On the rotary shafts 120 and 121, pins 122 and 123 for bearing the arm 109 are projectedly provided by calking.

Figure 4:
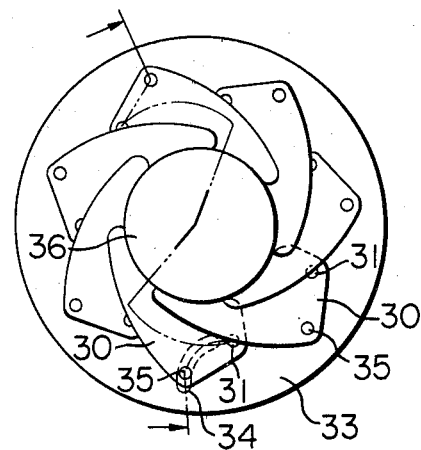
FIG. 4 is a schematic view of a diaphragm device.
Figure 5:
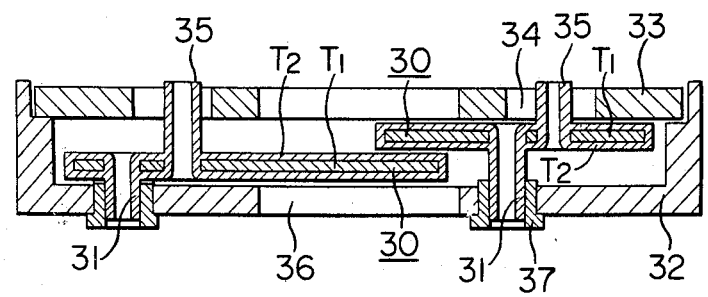
FIG. 5 is a cross-sectional view taken along the arrows in FIG. 4.

Referring to FIGS. 4 and 5, rotary shafts 31 formed integrally with diaphragm vanes 30 are rotatably supported on a fixed member 32 (which is shown only in FIG. 5). Another rotary shaft 35 formed integrally with the diaphragm vane 30 is fitted in a cam groove 34 formed in a diaphragm vane driving ring 33. Thus, when the driving ring 33 is rotated, the diaphragm vanes 30 pivot about the rotary shafts 31 and move back and forth in an opening 36. If these diaphragm vanes are formed of titanium material $T_1$ and a hardened layer $T_2$ is formed on the surface thereof, there may be obtained the same effect as that described above.

In the embodiments hitherto described, the following collateral examples are conceivable:

(A) The surface hardening treatment applied to the titanium material is carried out in such a manner that the degree of hardening differs from part to part, for example, the rotary shaft portions are hardened to a slightly lower degree of hardness so as to provide stickiness while the portions opposed to the aperture are hardened to a higher degree of hardness to minimize the deformation thereof during movement; and (B) The hollowed portions (in FIG. 2, the portions 4a and 5a do not rub against the vanes) are not subjected to the surface hardening treatment.

We claim:

1. In a light-intercepting device in a camera including a plurality of flat light-intercepting vanes disposed on a light-intercepting plane crossing an optical path, said light-intercepting vanes being driven so as to be parallel-moved relative to each other on said light-intercepting plane to thereby control the quantity of light passed therethrough, the improvement of said light-intercepting vanes comprising:

a substrate formed of titanium or a titanium alloy; and a hardened layer of titanium compound formed on the surface of said substrate.

2. A light-intercepting device according to claim 1, wherein said hardened layer consists of titanium nitride.

3. A light-intercepting device according to claim 1, wherein said hardened layer consists of titanium boride.

4. In a light-intercepting device in a camera including a plurality of flat light-intercepting vanes disposed on a light-intercepting plane crossing an optical path, said light-intercepting vanes being driven by a driving device engaged with an engaging portion formed integrally with said light-intercepting vanes, so as to be parallel-moved relative to each other on said light-intercepting plane to thereby control the quantity of light passed therethrough, the improvement of said light-intercepting vanes comprising:

a substrate formed of titanium or a titanium alloy; and a hardened layer of titanium compound formed on the surface of said substrate including at least said engaging portion.

* * * * *

UNITED STATES PATENT AND TRADEMARK OFFICE
CERTIFICATE OF CORRECTION

PATENT NO. : 4,298,265

DATED : November 3, 1981

INVENTOR(S) : ETSUO TANAKA, ET AL.

It is certified that error appears in the above-identified patent and that said Letters Patent are hereby corrected as shown below:

Column 3, line 1, "of" should be --in--.

Signed and Sealed this

Ninth Day of March 1982

[SEAL]

Attest:

GERALD J. MOSSINGHOFF

Attesting Officer     Commissioner of Patents and Trademarks